United States Patent [19]

Hackman, deceased et al.

[11] Patent Number: 4,704,043
[45] Date of Patent: Nov. 3, 1987

[54] MEANS AND TECHNIQUES USEFUL IN PUSH-PULL CONTROLS

[75] Inventors: Kenneth V. Hackman, deceased, late of Arcadia; by Kent J. Hackman, executor, Bradbury, both of Calif.

[73] Assignee: Southwest Products Co., Monrovia, Calif.

[21] Appl. No.: 857,029

[22] Filed: Apr. 29, 1986

[51] Int. Cl.$^4$ ............................................. F16C 11/06
[52] U.S. Cl. ..................................... 403/56; 403/143; 403/90; 403/77
[58] Field of Search ................. 403/56, 122, 143, 140, 403/135, 115, 77, 76, 74, 127, 128, 90; 29/149.5 B; 74/579

[56] References Cited

U.S. PATENT DOCUMENTS

| | | | |
|---|---|---|---|
| 1,086,145 | 2/1914 | Dodds | 403/128 X |
| 1,295,874 | 3/1919 | Dodds | 411/374 |
| 2,361,046 | 10/1944 | Molly | 403/122 X |
| 3,124,971 | 3/1964 | Peters et al. | 403/56 X |
| 3,531,145 | 9/1970 | Hackman | 403/260 |
| 4,438,612 | 3/1984 | Bernard et al. | 403/56 X |

Primary Examiner—Andrew V. Kundrat
Attorney, Agent, or Firm—Frank E. Mauritz

[57] ABSTRACT

Two spherical self-aligning bearings are interconnected by a collar or housing for the transmission of push and pull forces for obviating misalignment problems that arise, particularly in aircraft. In a modification the collar or housing itself may be formed so as to be a part, i.e. the outer race member of one or both of such bearings.

2 Claims, 3 Drawing Figures

MEANS AND TECHNIQUES USEFUL IN PUSH-PULL CONTROLS

The present invention relates to means and techniques useful in the transmission of push and pull forces between two objects and in particular in those instances where misalignment problems already exist or result from the operation of devices.

An object of the present invention is to provide improved means and techniques for obviating misalignment problems, particularly in aircraft wherein relative movement between two parts is accomplished by application of push and pull forces.

Another object of the present invention is to provide an essential part of a push-pull control that operates without binding, undue stressing of parts, misalignment of production of large bending moments and thus may be of light weight and not likely to break.

Another object of the present invention is to provide a new push-pull control assembly featured by the fact that the outer race member of a bearing is in a tube or collar (which in a modification may itself be the outer race member) instead of a stud as in prior art push-pull controls.

Another object of the present invention is to provide a new push-pull control as set forth in the preceding paragraph with the outer race member itself being in the form of a tube or housing that interconnects the spaced ball portions of two bearings.

Another object of the present invention is to provide a push-pull control which in operation adjusts itself to have two center lines instead of only one center line as in prior art controls.

The features of the present invention which are believed to be novel are set forth with particularity in the appended claims. This invention itself, both as to its organization and manner of operation, together with further objects and advantages may be best understood by reference to the following description taken in connection with the accompanying drawings in which:

Figure 1:
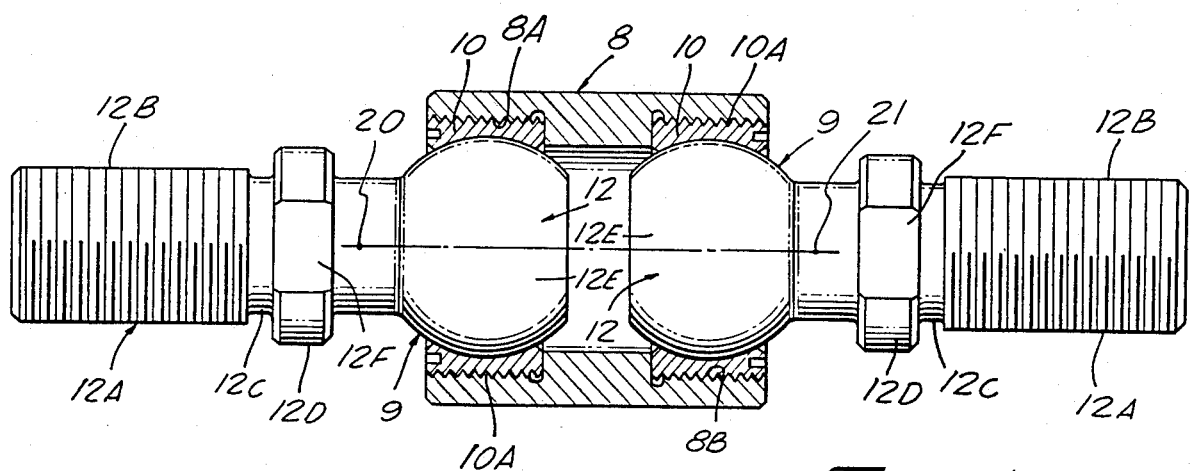
FIG. 1 illustrates the preferred form of the invention with the center lines of the two bearing shanks in alignment.
Figure 2:
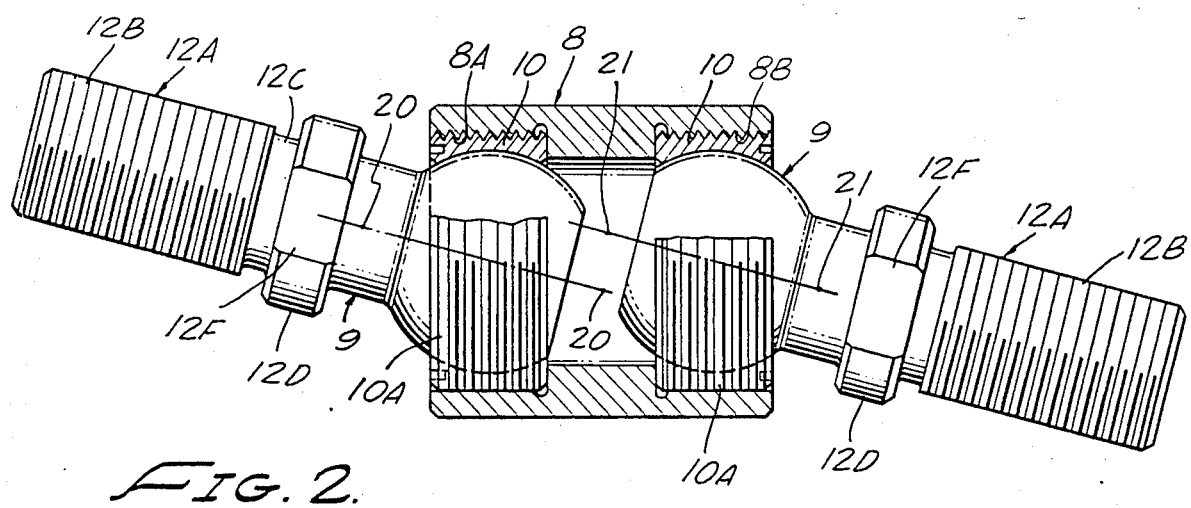
FIG. 2 illustrates the elements shown in FIG. 1 in a different operating position with center lines of the two ball studs displaced and in parallel relationship.

In FIGS. 1 and 2 a cylindrical collar or housing 8 has two spaced internally threaded portions 8A, 8B within which are threaded a corresponding one of two self-aligning bearings 9.

These two bearings 9,9 are each of the construction described and claimed in U.S. Pat. No. 3,531,145 of Kenneth V. Hackman patented Sept. 29, 1970.

Each self-aligning bearing 9 comprises an outer race member 10 having an inner spherical bearing surface contactable with a cooperating complementary spherical surface of a ball member 12. Each outer race member 10 which is generally cylindrical has an external screw threaded portion 10A engaging a corresponding housing threaded portion 8A,8B.

The inner ball portion 12 of each bearing is formed with a cylindrical shank portion 12A with a threaded portion 12B thereon that terminates at a necked portion 12C of decreased diameter and adjacent to the shouldered portion 12D. Portion 12D is smaller than the ball portion 12E and is larger than the shank portion 12A and is provided with one or more flat portions 12F for turning by a wrench.

This dual arrangement of self-aligning bearings has the important capability of transmitting push or pull forces along a single coextensive axis as in FIG. 1 wherein the bearing axes 20, 21 are in alignment or along their two displaced axes 20,21 in the configuration shown in FIG. 2. Allowable displacement of these two axis results in greatly improved performances some of which are set forth in the above recited objects of the invention.

Figure 3:
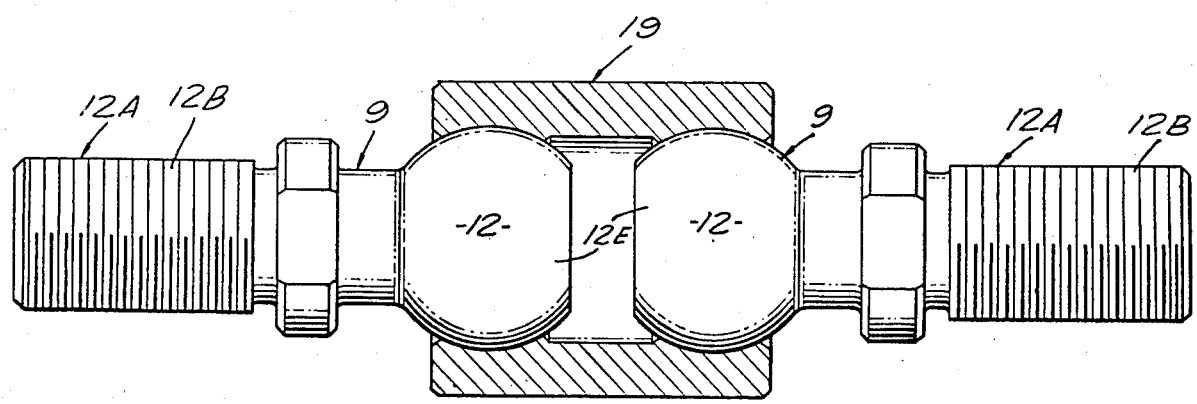
FIG. 3 illustrates a modified form of the invention.

In the modification shown in FIG. 3 the construction and operation are essentially the same except that the collar or housing 19 serves as such in addition to serving as the outer race member for the two spaced bearing ball portions 12E. The ends of the housing 19 may be formed around the corresponding ball portion 12E for these purposes using the teachings of Potter U.S. Pat. No. 2,727,142 or Evans U.S. Pat. No. 3,085,312.

The shank portion 12A of of one of the bearings may, for example, be connected to a power actuator or an extension thereof and the shank portion 12A of the other bearing may be connected to an aircraft entrance door or an extension thereof for effecting opening and closing of such door. In performing its function of a push-pull control i.e. its capability of transmitting either a push force or a pull force it is essential that the ball portions 12, 12 be free to rotate in their corresponding race member 10,10 and yet be prevented from moving along ocrresponding ball or shank axes 20,21 to cause a change in alignment of such axes from the condition illustrated in FIG. 1 to the condition illustrated in FIG. 2. Thus in both FIGS. 1 and 3 the spaced ball portions 12,12 are each prevented from moving in either axial direction along its corresponding bearing axis 20,21. This is so because in FIG. 1 the corresponding outer spherical race member 10, 10 is formed completely around the corresonding ball shaped members to thereby prevent any such undesired axial movement. Also, for the same purpose, in FIG. 1 the threaded movement of the external threaded race members 10,10 in the corresponding internal spaced threaded portions 8A,8B of the collar or housing 8 is limited or restricted by their engagement with that shouldered portion which is between said threaded portions 8A,8B and which is of smaller internal diameter than said threaded portions 8A,8B. Such limited or restricted movement of race members 10,10 prevents axial movement of ball portions along corresonding axes 20,21 but yet allows relative displacement of such axes 20,21 as illustrated in FIG. 2 so as to transmit either push or pull forces in accomplishing functions of a push-pull control.

While the particular embodiments of the present invention have been shown and described, it will be obvious to those skilled in the art that changes and modifications may be made without departing from the invention in its broader aspects and therefor the aim in the appended claims is to cover all such changes and modifications as fall within the true spirit and scope of this invention.

What is claimed is:

1. In a push-pull control that functions to transmit actuating forces in either one of two directions between two spaced self-aligning bearings which are free to become misaligned with respect to each other by said actuating forces, a first and a second self-aligning bearing, an elongated housing member for maintaining said first and said second bearings in spaced relationship, said first bearing having a first ball portion and a first single piece cooperating spherical race member engaging said first ball portion and providing the sole means for rotatably maintaining said first ball portion therein and preventing axial movement therein, said second bearing having a second ball portion and a second single piece cooperating spherical race member engaging said second ball portion and providing the sole means for rotatably maintaining said second ball portion therein and preventing axial movement therein, separate means at each end of said housing member for releasably securing a corresponding one of said first and said second race members, and force applying means extending from each of said ball portions for the application of push-pull actuating forces to said push-pull control, said elongated member has an internal threaded portion, and one of said race members has an externally threaded portion engaging said internal threaded portion, said elongated member having an internal shouldered portion of smaller internal diameter than said internal threaded portion, and said one race member engaging said shouldered portion to restrict threaded movement of said race member in said elongated member.

2. A control as set forth in claim 1 in which said elongated member has a second internally threaded portion and the other one of said race members has an external threaded portion engaging said second internal threaded portion and also engaging said shouldered portion to restrict threaded movement of said race member in said elongated member.

* * * * *